(12) United States Patent
Kuriki et al.

(10) Patent No.: US 9,735,419 B2
(45) Date of Patent: Aug. 15, 2017

(54) SECONDARY BATTERY AND METHOD FOR FORMING ELECTRODE OF SECONDARY BATTERY

(75) Inventors: Kazutaka Kuriki, Kanagawa (JP); Tamae Moriwaka, Kanagawa (JP); Satoshi Murakami, Kanagawa (JP)

(73) Assignee: SEMICONDUCTOR ENERGY LABORATORY CO., LTD., Kanagawa-ken (JP)

( * ) Notice: Subject to any disclaimer, the term of this patent is extended or adjusted under 35 U.S.C. 154(b) by 327 days.

(21) Appl. No.: 13/050,978

(22) Filed: Mar. 18, 2011

(65) Prior Publication Data

US 2011/0236754 A1 Sep. 29, 2011

(30) Foreign Application Priority Data

Mar. 26, 2010 (JP) .................. 2010-073768

(51) Int. Cl.
*H01M 4/134* (2010.01)
*H01M 4/1395* (2010.01)
(Continued)

(52) U.S. Cl.
CPC ......... *H01M 4/134* (2013.01); *H01M 4/0428* (2013.01); *H01M 4/0471* (2013.01);
(Continued)

(58) Field of Classification Search
CPC ...... H01M 4/02; H01M 4/134; H01M 4/1395; H01M 4/386; H01M 4/661; H01M 4/8867;
(Continued)

(56) References Cited

U.S. PATENT DOCUMENTS

| 4,409,134 A | 10/1983 | Yamazaki |
| 6,242,132 B1 | 6/2001 | Neudecker et al. |

(Continued)

FOREIGN PATENT DOCUMENTS

| CN | 1614799 | 5/2005 |
| CN | 1677723 | 10/2005 |

(Continued)

OTHER PUBLICATIONS

International Search Report (Application No. PCT/JP2011/055855 PCT13365) Dated May 17, 2011.
(Continued)

*Primary Examiner* — Ula C Ruddock
*Assistant Examiner* — Thomas Parsons
(74) *Attorney, Agent, or Firm* — Nixon Peabody LLP; Jeffrey L. Costellia (57) ABSTRACT

An object is to provide a secondary battery having excellent charge-discharge cycle characteristics. A secondary battery including an electrode containing silicon or a silicon compound is provided, in which the electrode is provided with a layer containing silicon or a silicon compound over a layer of a metal material; a mixed layer of the metal material and the silicon is provided between the metal material layer and the layer containing silicon or a silicon compound; the metal material has higher oxygen affinity than that of ions which give and receive electric charges in the secondary battery; and an oxide of the metal material does not have an insulating property. The ions which give and receive electric charges are alkali metal ions or alkaline earth metal ions.

37 Claims, 10 Drawing Sheets (51) Int. Cl.
*H01M 4/04* (2006.01)
*H01M 4/38* (2006.01)
*H01M 4/66* (2006.01)

(52) U.S. Cl.
CPC .......... *H01M 4/1395* (2013.01); *H01M 4/38* (2013.01); *H01M 4/661* (2013.01); *H01M 4/662* (2013.01); *H01M 4/667* (2013.01); *Y10T 29/49108* (2015.01); *Y10T 29/49115* (2015.01)

(58) Field of Classification Search
CPC . H01M 4/8882; H01M 4/0428; H01M 4/0471
USPC .... 429/209, 220, 223, 231.5, 219; 29/632.1, 29/623.5
See application file for complete search history.

(56) References Cited

U.S. PATENT DOCUMENTS

| | | | |
|---|---|---|---|
| 6,617,626 | B2 | 9/2003 | Ozawa et al. |
| 6,685,804 | B1 | 2/2004 | Ikeda et al. |
| 6,730,434 | B1 | 5/2004 | Kawakami et al. |
| 6,887,511 | B1 | 5/2005 | Shima et al. |
| 6,949,312 | B1 | 9/2005 | Kawakami et al. |
| 7,141,187 | B2 | 11/2006 | Kosuzu et al. |
| 7,153,611 | B2 | 12/2006 | Minami et al. |
| 7,183,018 | B2 | 2/2007 | Kawakami et al. |
| 7,192,673 | B1 | 3/2007 | Ikeda et al. |
| 7,195,842 | B1 | 3/2007 | Fujimoto et al. |
| 7,235,330 | B1 | 6/2007 | Fujimoto et al. |
| 7,241,533 | B1 | 7/2007 | Ikeda et al. |
| 7,311,999 | B2 | 12/2007 | Kawase et al. |
| 7,316,792 | B2 | 1/2008 | Kosuzu et al. |
| 7,402,829 | B2 | 7/2008 | Green |
| 7,410,728 | B1 | 8/2008 | Fujimoto et al. |
| 7,432,014 | B2 * | 10/2008 | Konishiike et al. .......... 429/128 |
| 7,459,233 | B2 | 12/2008 | Konishiike et al. |
| 7,534,528 | B2 | 5/2009 | Kawakami et al. |
| 7,625,668 | B2 | 12/2009 | Konishiike et al. |
| 7,683,359 | B2 | 3/2010 | Green |
| 7,794,881 | B1 | 9/2010 | Fujimoto et al. |
| 7,803,290 | B2 | 9/2010 | Kosuzu et al. |
| 7,838,147 | B2 | 11/2010 | Kawase et al. |
| 2001/0016281 | A1 | 8/2001 | Ito |
| 2004/0058492 | A1 | 3/2004 | Tatsumi |
| 2004/0063278 | A1 | 4/2004 | Lian et al. |
| 2004/0161670 | A1 | 8/2004 | Kawase et al. |
| 2004/0234861 | A1 | 11/2004 | Kawase et al. |
| 2005/0029907 | A1 | 2/2005 | Uchiyama et al. |
| 2005/0153208 | A1 | 7/2005 | Konishiike et al. |
| 2007/0128520 | A1 | 6/2007 | Konishiike et al. |
| 2007/0128521 | A1 | 6/2007 | Konishiike et al. |
| 2007/0194391 | A1 | 8/2007 | Murthy et al. |
| 2008/0020281 | A1 | 1/2008 | Kogetsu et al. |
| 2008/0135801 | A1 | 6/2008 | Kizaki et al. |
| 2008/0153000 | A1 | 6/2008 | Salot et al. |
| 2009/0001936 | A1 | 1/2009 | Green |
| 2009/0117264 | A1 | 5/2009 | Weydanz et al. |
| 2009/0126589 | A1 | 5/2009 | Maxwell et al. |
| 2010/0065851 | A1 | 3/2010 | Makita |
| 2010/0068415 | A1 | 3/2010 | Roca I Cabarrocas et al. |
| 2010/0156353 | A1 | 6/2010 | Iyer et al. |
| 2010/0310936 | A1 | 12/2010 | Ohira et al. |
| 2011/0073561 | A1 | 3/2011 | Yamazaki et al. |
| 2011/0236753 | A1 | 9/2011 | Kuriki et al. |

FOREIGN PATENT DOCUMENTS

| | | |
|---|---|---|
| EP | 1033767 A | 9/2000 |
| EP | 1039568 A | 9/2000 |
| EP | 1 109 243 A2 | 6/2001 |
| EP | 1231651 A | 8/2002 |
| EP | 1231653 A | 8/2002 |
| EP | 1231654 A | 8/2002 |
| EP | 1237210 A | 9/2002 |
| EP | 1244163 A | 9/2002 |
| EP | 1244164 A | 9/2002 |
| EP | 1246278 A | 10/2002 |
| EP | 1 465 268 A2 | 10/2004 |
| EP | 1921699 A | 5/2008 |
| EP | 2219253 A | 8/2010 |
| JP | 11-144734 A | 5/1999 |
| JP | 11-233116 A | 8/1999 |
| JP | 2000-311681 A | 11/2000 |
| JP | 2001-176545 | 6/2001 |
| JP | 2001-210315 A | 8/2001 |
| JP | 2001-266851 A | 9/2001 |
| JP | 2002-093411 A | 3/2002 |
| JP | 2002-237294 A | 8/2002 |
| JP | 2003-017040 | 1/2003 |
| JP | 2003-077529 | 3/2003 |
| JP | 2004-171874 A | 6/2004 |
| JP | 2004-171904 | 6/2004 |
| JP | 2004-207113 A | 7/2004 |
| JP | 2004-281317 | 10/2004 |
| JP | 2004-288564 A | 10/2004 |
| JP | 2004-311141 | 11/2004 |
| JP | 2005-141992 | 6/2005 |
| JP | 2007-123096 | 5/2007 |
| JP | 2009-134917 | 6/2009 |
| JP | 2010-282957 | 12/2010 |
| KR | 10-2004-0086818 | 10/2004 |
| KR | 10-2005-0043653 | 5/2005 |
| WO | WO-01/31721 | 5/2001 |

OTHER PUBLICATIONS

'Written Opinion (Application No. PCT/JP2011/055855, PCT13365) Dated May 17, 2011.

Zhou.S et al., "Si/TiSi2 Heteronanostructures as High-Capacity Anode Material for Li Ion Batteries,", NANO Letters, 2010, vol. 10, No. 3, pp. 860-863, ACS Publications.

Zaima S. et al., "Silicide Formation at the metal/silicon interface of metal and silicon, and its low-resistance contact", Oyobuturi, 1994, vol. 63, No. 11, pp. 1093-1105, JSAP(The Japan Society of Applied Physics).

Japanese Office Action (Application No. 2014-204807) Dated Jun. 9, 2015.

* cited by examiner

SECONDARY BATTERY AND METHOD FOR FORMING ELECTRODE OF SECONDARY BATTERY

TECHNICAL FIELD

The technical field relates to a secondary battery and a method for forming an electrode of the secondary battery.

BACKGROUND ART

In recent years, with the advance of environmental technology, development of power generation devices (e.g., solar power generation devices) which pose less burden on the environment than power generation devices using conventional power generation methods has been actively conducted. Concurrently with the development of power generation technology, development of power storage devices has also been underway.

As an example of a power storage device, a lithium ion battery which is a secondary battery can be given. A lithium ion battery is widely prevalent because energy density thereof is high and the lithium ion battery is well suited for miniaturization. As an electrode material of a lithium ion battery, a material in/from which lithium ions can be inserted and extracted is preferably used, and graphite, silicon, and the like can be given as examples of the electrode material of a lithium ion battery. In particular, the theoretical capacity of silicon is about ten times as high as that of graphite; thus, silicon is expected to be a host material of lithium.

However, there has been a problem in that, when $LiPF_6$, $LiBF_4$, $LiAsF_6$, or the like is used as an electrolyte in a secondary battery including an electrode containing silicon or a silicon compound, sufficient charge-discharge cycle characteristics and sufficient storage characteristics are not obtained. Patent Document 1 discloses a secondary battery in which concentration of at least one of these electrolytes is less than $0.1 \text{ mol} \cdot dm^{-3}$, whereby sufficient charge-discharge cycle characteristics and sufficient storage characteristics are obtained.

REFERENCE

[Patent Document 1] Japanese Published Patent Application No. 2001-176545

DISCLOSURE OF INVENTION

An object of one embodiment of the present invention is to provide a secondary battery having excellent charge-discharge cycle characteristics.

In particular, an object of one embodiment of the present invention is to provide a secondary battery having excellent charge-discharge cycle characteristics, while concentration of $LiPF_6$, $LiBF_4$, $LiAsF_6$, or the like included in an electrolyte is kept (is not reduced).

Further, an object of one embodiment of the present invention is to form an electrode of the secondary battery in a simple process.

One embodiment of the present invention is a secondary battery including an electrode containing silicon or a silicon compound, in which the electrode is provided with a layer containing silicon or a silicon compound over a layer of a metal material; a mixed layer of the metal material and the silicon is provided between the metal material layer and the layer containing silicon or a silicon compound; the oxygen affinity of the metal material is higher than the oxygen affinity of ions which give and receive electric charges in the secondary battery; and an oxide of the metal material has conductivity. The ions which give and receive electric charges may be alkali metal ions or alkaline earth metal ions.

In the secondary battery, the oxide of the metal material may be, for example, an oxide semiconductor. As such a metal material, titanium can be given, for example. Alternatively, nickel, copper, indium, tin, silver, or the like may be used instead of titanium.

In the case where silicon is used as an active material, a silicon film may be formed over a current collector by a plasma CVD method, a sputtering method, or the like, for example.

Note that a material layer whose conductivity is higher than that of the metal material layer is preferably provided in contact with the metal material layer. Further, it is preferable that the material layer with high conductivity be formed using a material which is more inexpensive than a material of the metal material layer. As such a material, copper, iron, nickel, stainless steel, and the like can be given in the case where the metal material is titanium.

Note that as the mixed layer of the metal material and the silicon, a layer of silicide of the metal material can be given, for example.

According to one embodiment of the present invention, a secondary battery having excellent charge-discharge cycle characteristics can be obtained while concentration of an electrolyte is kept (is not reduced). Further, the secondary battery can be manufactured in a simple process.

BEST MODE FOR CARRYING OUT THE INVENTION

An embodiment of the present invention is described in detail with reference to drawings. However, the present invention is not limited to the description below and it is easily understood by those skilled in the art that the mode and details can be changed variously. Therefore, the present invention is not construed as being limited to description of the embodiment below.

In this embodiment, a secondary battery which is one embodiment of the present invention is described with reference to drawings.

Figure 1:
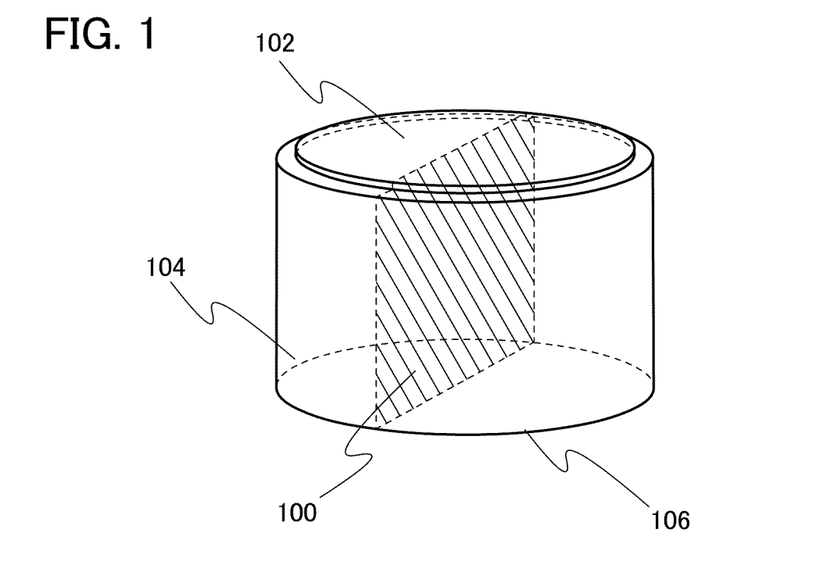
FIG. 1 is a perspective view showing an example of a cylindrical secondary battery which is one embodiment of the present invention.

FIG. 1 is a schematic perspective view of an example of a cylindrical secondary battery which is one embodiment of the present invention. Note that the secondary battery of one embodiment of the present invention is not limited to the cylindrical secondary battery, and may be a square secondary battery. Alternatively, the secondary battery of one embodiment of the present invention may be a coin-type secondary battery.

The cylindrical secondary battery in FIG. 1 has a closed space surrounded by a battery sidewall 104, a battery cover 102, and a battery bottom 106.

Figure 2:
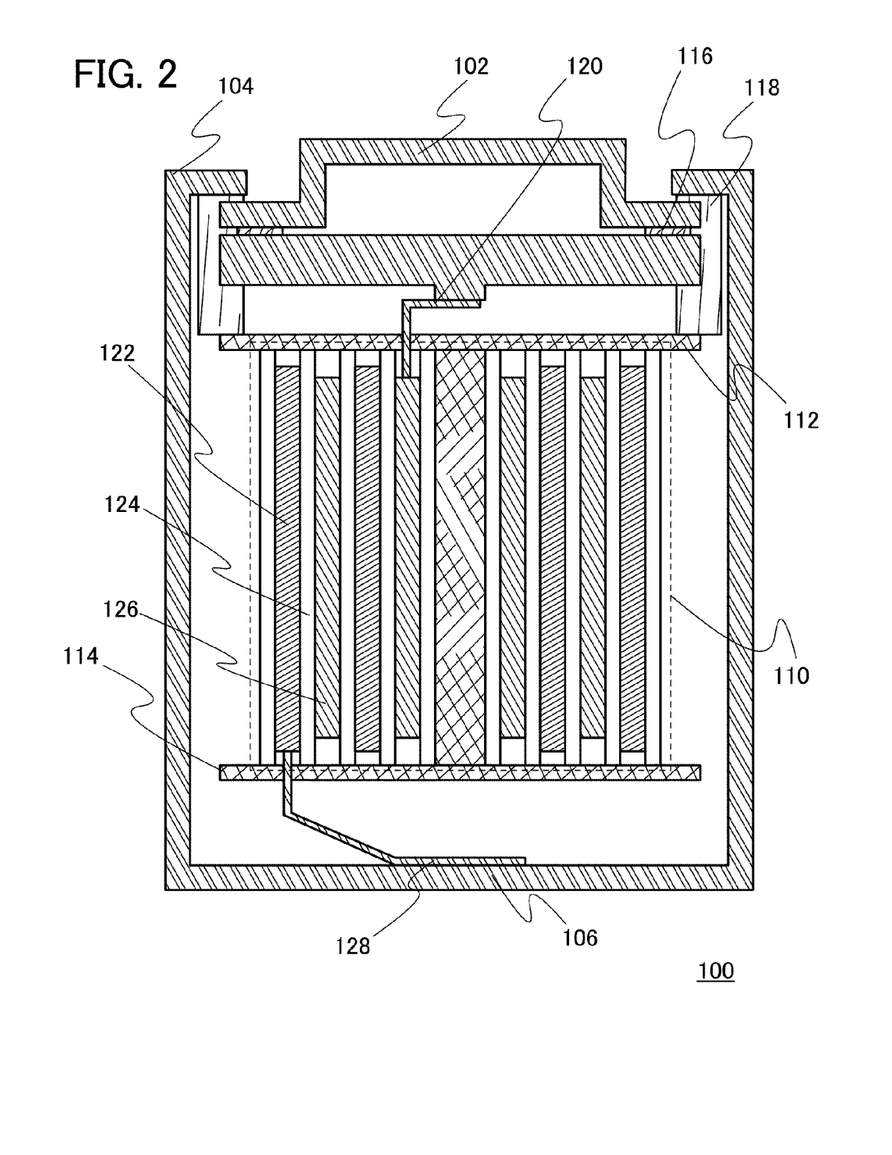
FIG. 2 is a cross-sectional view taken along a cross section 100 of the cylindrical secondary battery in FIG. 1.

FIG. 2 is a cross-sectional view taken along a cross section 100 of the cylindrical secondary battery in FIG. 1.

The battery sidewall 104 and the battery bottom 106 may be formed using conductive materials, and a material which has sufficient mechanical strength and chemical resistance in a usage environment of the battery may be selected. As a material for the battery sidewall 104 and the battery bottom 106, an aluminum alloy can be used, for example. The closed space surrounded by the battery sidewall 104, the battery bottom 106, and the battery cover 102 is provided in the battery. In the closed space, an electrode body 110 is provided, for example. A wound electrode body is illustrated as an example of the electrode body 110 in FIG. 2; however, this embodiment is not limited to this.

The electrode body 110 is sandwiched between insulating plates 112 and 114 which are provided in an upper portion (on a battery cover 102 side) and a lower portion (on a battery bottom 106 side), respectively, and conductors 120 and 128 are taken out through the insulating plates 112 and 114, respectively. It is preferable that the conductor 120 taken out through the insulating plate 112 which is in the upper portion (on the battery cover 102 side) be electrically connected to the battery cover 102 through a resistor 116. As the resistor 116, a heat sensitive resistor whose resistance increases as a temperature rises is preferably used. This is for prevention of abnormal heat generation due to excessive current flow. The conductor 128 taken out through the insulating plate 114 which is in the lower portion (on the battery bottom 106 side) is connected to the battery bottom 106. Note that the battery bottom 106 and the battery sidewall 104 are electrically connected to each other.

The battery sidewall 104, the battery cover 102, and the insulating plate 112 which is in the upper portion (on the battery cover 102 side) are preferably provided with a gasket 118 interposed therebetween. It is preferable that the gasket 118 have an insulating property; however, the kind of the gasket 118 is not limited to this, and any gasket can be used as long as the battery cover 102 and the battery sidewall 104 are insulated from each other.

Although not illustrated, a structure in which a safety valve is provided inside the battery in order to cut electrical connection between the battery cover 102 and the electrode body 110 in the case where a short circuit occurs between a negative electrode 122 and a positive electrode 126 (an electrode whose polarity is opposite to that of the negative electrode 122) or in the case where a pressure in the battery is increased by being heated may be employed.

Note that a center pin may be provided in the center of the electrode body 110 to fix the electrode body 110.

The electrode body 110 includes the negative electrode 122, the positive electrode 126, and a separator 124 which is provided between the negative electrode 122 and the positive electrode 126. The negative electrode 122 included in the electrode body 110 is electrically connected to the battery bottom 106 through the conductor 128. The positive electrode 126 included in the electrode body 110 is electrically connected to the battery cover 102 through the conductor 120.

The positive electrode 126 includes a positive electrode current collector and a positive electrode active material layer provided on both sides of the positive electrode current collector. Note that the positive electrode active material layer may be provided only on one side of the positive electrode current collector. A surface of the positive electrode current collector may be metal foil such as titanium, for example. Further, metal foil with higher conductivity than titanium may be covered with titanium. Furthermore, nickel, copper, indium, tin, or silver can be used instead of titanium.

The positive electrode active material layer includes a material in/from which ions which are electrode reactive materials can be inserted and extracted. Ions which give and receive electric charges may be alkali metal ions or alkaline earth metal ions. As ions which give and receive electric charges, lithium ions are preferably used.

Silicon can be used as the material in/from which ions can be inserted and extracted.

With the use of silicon for the positive electrode active material, the positive electrode active material layer can be formed thin and thus can be reduced in size and weight. For example, as compared to the case where graphite is used for the positive electrode active material, the thickness of the positive electrode active material layer can be reduced to about one tenth. In the case where the positive electrode active material layer is not formed thin, the capacity of the secondary battery can be increased.

Further, a titanium film or the like may be formed as the positive electrode current collector over a substrate such as a glass substrate or a plastic substrate by a sputtering method, and a silicon film may be formed as the positive electrode active material layer over the titanium film or the like by a plasma CVD method or the like. At this time, it is preferable that a source gas contain hydrogen as little as possible in forming the silicon film.

A method for forming an electrode over a substrate is described with reference to FIGS. 3A to 3C.

Figure 3A:
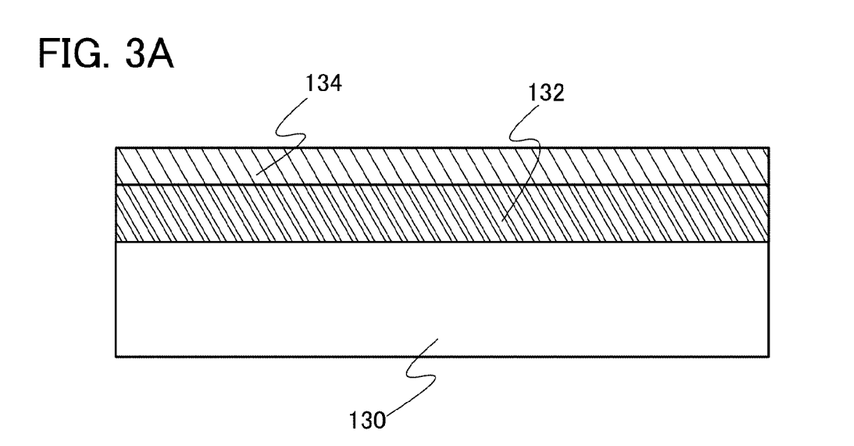
FIGS. 3A to 3C show an example of a method for forming an electrode.

First, a current collector layer 132 is formed over a substrate 130, and an active material layer 134 is formed over the current collector layer 132 (FIG. 3A). For example, a glass substrate as the substrate 130 may be loaded into a reaction chamber; a titanium layer may be formed as the current collector layer 132 over the substrate 130 by a sputtering method; and an amorphous silicon layer including phosphorus may be formed as the active material layer 134 over the current collector layer 132 by a plasma CVD method. As described above, the active material layer 134 can be formed thin. However, if the thickness of the active material layer 134 is too small, the capacity of the secondary battery is reduced. Therefore, the active material layer 134 is formed to a thickness of 50 nm to 10 μm inclusive, preferably 100 nm to 5 μm inclusive.

Note that for example, a metal substrate with higher conductivity than a material of the current collector layer 132 is preferably used as the substrate 130.

Figure 3B:
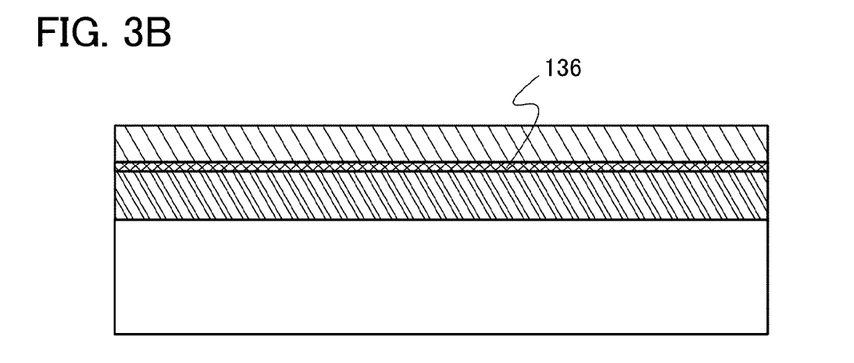

Next, the substrate 130 is subjected to heat treatment, whereby a mixed layer 136 of a material of the current collector layer 132 and a material of the active material layer 134 is formed between the current collector layer 132 and the active material layer 134 (FIG. 3B). For example, a mixed layer of titanium and silicon may be formed as the mixed layer 136. Note that here, it is preferable that the mixed layer of titanium and silicon be a titanium silicide layer. The temperature of the heat treatment may be a temperature at which the mixed layer 136 can be formed; the temperature may be 500° C. or higher, preferably 700° C.

Note that the heat treatment is performed at a strain point of the substrate or a temperature at which the substrate is not changed in shape and quality. Alternatively, the current collector layer 132 may be formed while the heat treatment is performed.

Note that it is preferable that the mixed layer 136 be provided between the current collector layer 132 and the active material layer 134 because the variation in electrical conductivity between the current collector layer 132 and the active material layer 134 can be relieved.

Figure 3C:
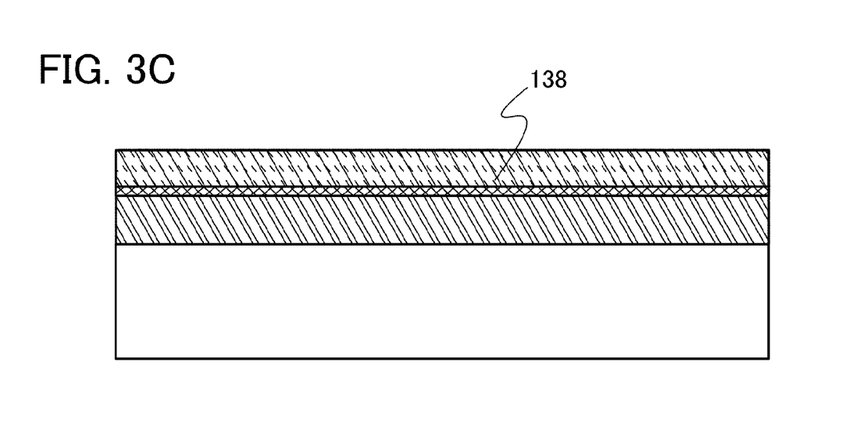

Next, lithium is contained in the active material layer 134, or in both the active material layer 134 and the mixed layer 136, so that a lithium-containing layer 138 is formed (FIG. 3C). Here, lithium may be contained by a doping method.

Note that phosphorus is preferably contained in the silicon film formed as the active material layer 134. When phosphorus is contained in the silicon film, the occurrence of peeling between the titanium film and the silicon film can be prevented. In order to make phosphorus be contained in the silicon film, phosphine may be contained in a source gas, for example.

Note that the crystallinity of the silicon film formed as the active material layer 134 is not particularly limited, and the silicon film may be amorphous or crystalline. As the silicon film formed as the active material layer 134, an amorphous silicon film, a microcrystalline silicon film, and a polycrystalline silicon film can be given, for example. Here, the silicon film may be subjected to a crystallization step. In the case where the silicon film is subjected to a crystallization step, the silicon film may be crystallized by being subjected to heat treatment after the concentration of hydrogen in the silicon film is sufficiently reduced, or may be crystallized by being irradiated with a laser beam.

The concentration of hydrogen in the silicon film of this embodiment which is formed in the above manner is preferably higher than or equal to $1.0 \times 10^{18}$ cm$^{-3}$ and lower than or equal to $1.0 \times 10^{21}$ cm$^{-3}$.

The separator 124 may be formed using a porous film which is impregnated with an electrolyte solution, which is a liquid electrolyte. As a material of the porous film, a synthetic resin material, a ceramic material, or the like may be used. As the material of the porous film, polyethylene, polypropylene, or the like can be preferably used.

Note that as the separator 124, paper, nonwoven fabric, a glass fiber, or a synthetic fiber such as nylon (polyamide), vinylon (a polyvinyl alcohol based fiber, and also referred to as vinalon), polyester, acrylic, polyolefin, polyurethane, or the like can be used. However, a material which does not dissolve in an electrolyte solution should be selected.

As the electrolyte solution in which the separator 124 is soaked, for example, a mixture in which lithium hexafluorophosphate (compositional formula: LiPF$_6$) is added to a mixed solution of ethylene carbonate (EC) and diethyl carbonate (DEC) may be used. Further, as the electrolyte, lithium chloride (compositional formula: LiCl), lithium fluoride (compositional formula: LiF), lithium perchlorate (compositional formula: LiClO$_4$), lithium tetrafluoroborate (compositional formula: LiBF$_4$), lithium bis(trifluoromethanesulfonyl)imide (compositional formula: LiN(SO$_2$CF$_3$)$_2$), lithium bis(pentafluoroethanesulfonyl)imide (compositional formula: LiN(SO$_2$C$_2$F$_5$)$_2$), lithium trifluoromethansulfonate (compositional formula: LiCF$_3$SO$_3$), or the like can be used. Furthermore, in the case where an alkali metal ion other than a lithium ion is used, sodium chloride (compositional formula: NaCl), sodium fluoride (compositional formula: NaF), sodium perchlorate (compositional formula: NaClO$_4$), sodium tetrafluoroborate (compositional formula: NaBF$_4$), potassium chloride (compositional formula: KCl), potassium fluoride (compositional formula: KF), potassium perchlorate (compositional formula: KClO$_4$), potassium fluoroborate (compositional formula: KBF$_4$), or the like can be used, one or more of which may be dissolved in a solvent.

Examples of the solvent include, as well as the ethylene carbonate and the diethyl carbonate, cyclic carbonates such as propylene carbonate, butylene carbonate, and vinylene carbonate; acyclic carbonates such as dimethyl carbonate, ethylmethyl carbonate, methylpropyl carbonate, methylisobutyl carbonate, and dipropyl carbonate; aliphatic carboxylic acid esters such as methyl formate, methyl acetate, methyl propionate, and ethyl propionate; γ-lactones such as γ-butyrolactone; acyclic ethers such as 1,2-dimethoxyethane, 1,2-diethoxyethane, and ethoxymethoxy ethane; cyclic ethers such as tetrahydrofuran, 2-methyltetrahydrofuran, and 1,3-dioxolane; alkyl phosphate esters such as trimethyl phosphate, triethyl phosphate, and trioctyl phosphate; dimethylsulfoxide; and the like, all of which can be used either alone or in combination. Further, hydrogen in the above substances may be substituted by fluorine.

In one embodiment of the present invention, charge-discharge cycle characteristics of a secondary battery can be improved while the concentration of an electrolyte contained in an electrolyte solution is kept (is not reduced).

The above-described electrode functions as a positive electrode in the case where an electrode opposite to the electrode is formed using lithium, or alternatively functions as a negative electrode in the case where the opposite electrode is formed using a metal material whose oxidation-reduction potential is higher than that of silicon. The negative electrode preferably includes a current collector and an active material in a manner similar to that of the positive electrode. Further, a composite oxide layer containing lithium metal, which serves as an active material, may be formed over a current collector. Note that another alkali metal may be used instead of lithium.

An example of a positive electrode in the case where the above-described electrode functions as a negative electrode is described below.

As the positive electrode active material, a material including both ions functioning as carriers and a transition metal can be used, for example. As an example of the material including ions functioning as carriers and a transition metal, a material represented by a general formula $A_xM_yPO_z$ ($x>0$, $y>0$, $z>0$) can be given. Here, A represents, for example, an alkali metal such as lithium, sodium, or potassium, or an alkaline earth metal such as beryllium, magnesium, calcium, strontium, or barium. M represents, for example, a transition metal such as iron, nickel, manganese, or cobalt. As the material represented by the general formula $A_xM_yPO_z$ ($x>0$, $y>0$, $z>0$), lithium iron phosphate, sodium iron phosphate, and the like can be given. As materials represented by A and M, one or a plurality of the above materials may be selected.

Alternatively, a material represented by a general formula $A_xM_yO_z$ ($x>0$, $y>0$, $z>0$) can be used as the positive electrode active material. Here, A represents, for example, an alkali metal such as lithium, sodium, or potassium or an alkaline earth metal such as beryllium, magnesium, calcium, strontium, or barium. M represents, for example, a transition metal such as iron, nickel, manganese, or cobalt. As the material represented by the general formula $A_xM_yO_z$ ($x>0$, $y>0$, $z>0$), lithium cobaltate, lithium manganate, lithium nickelate, and the like can be given. As materials represented by A and M, one or a plurality of the above materials may be selected.

The positive electrode active material layer may be formed by mixing the positive electrode active material with a conductive agent, a binder, or the like and processed into a paste which is then applied over a positive electrode current collector, or may be formed by a sputtering method. As a material of the positive electrode current collector, titanium and the like can be given.

As described above, a secondary battery which is one embodiment of the present invention can be manufactured. A secondary battery of this embodiment can have excellent charge-discharge cycle characteristics while the concentration of an electrolyte is kept (is not reduced). Further, a secondary battery of this embodiment can be manufactured in a simple process.

Example 1

In this example, a secondary battery which is one embodiment of the present invention is manufactured and a result of examining characteristics of the secondary battery is described. In this example, a sample 1 and a sample 2 were manufactured as positive electrodes.

First, as a positive electrode current collector, high-purity titanium foil was used.

As a positive electrode active material, silicon was used. Amorphous silicon was used for the positive electrode active material of each of the sample 1 and the sample 2. The amorphous silicon was formed over a titanium current collector by a plasma CVD method. Here, the amorphous silicon film was formed by a plasma CVD method in the following manner. Source gases were introduced into a reaction chamber at the flow rate of silane of 60 sccm and the flow rate of 5 vol % phosphine (diluted with hydrogen) of 20 sccm until the pressure in a treatment chamber is stabilized to 133 Pa; the temperature of a substrate was set to 280° C.; an RF power source frequency was set to 60 MHz; a pulse repetition rate of an RF power source was set to 20 kHz; a pulse duty ratio was set to 70%; and the power of the RF power source was set to 100 W. Plasma discharge was performed under such conditions. The thickness of the titanium current collector was 100 μm, and the thickness of the positive electrode active material layer of each of the sample 1 and the sample 2 was 3 μm.

Then, only the sample 1 was subjected to heat treatment at 700° C. The heat treatment was performed under an Ar atmosphere for six hours.

In this manner, the positive electrode active material layer was formed over the positive electrode current collector. With the use of the positive electrode formed as described above, a coin-type secondary battery was manufactured. Here, a method for manufacturing a coin-type secondary battery is briefly described with reference to FIG. 10. The thickness of the positive electrode active material layer was 3 μm.

Figure 10:
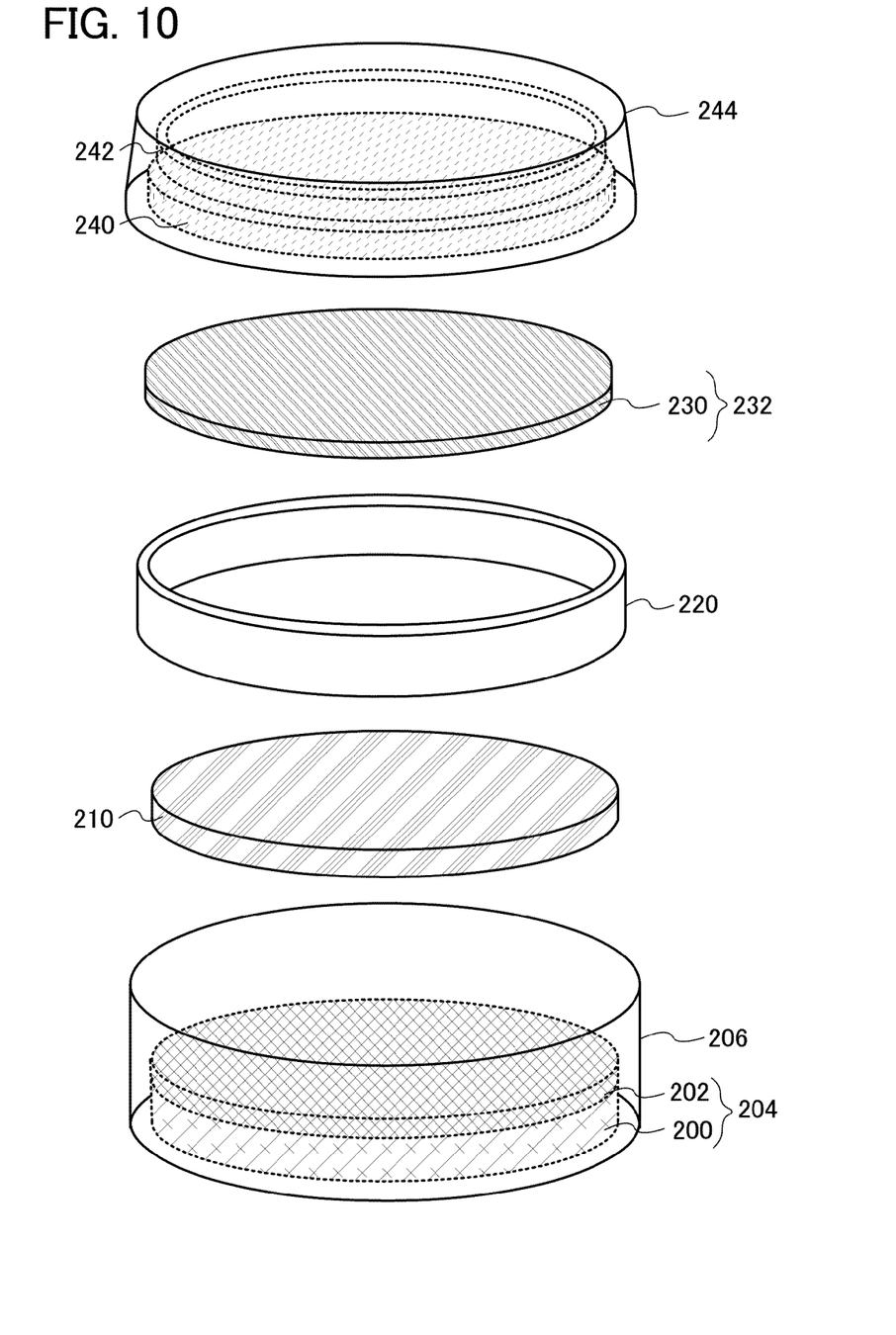
FIG. 10 shows an example of a method for manufacturing a coin-type secondary battery which is one embodiment of the present invention.

As a positive electrode 204, a negative electrode 232, a ring-shaped insulator 220, and a separator 210, which were components of a coin-type lithium ion secondary battery cell, commercially available objects were used. In the positive electrode 204, a positive electrode active material layer 202 was provided over a positive electrode current collector 200. In the negative electrode 232, a negative electrode active material layer 230 was formed using lithium foil. The separator 210 was formed using polypropylene. The positive electrode 204, the negative electrode 232, and the separator 210 were soaked in an electrolyte solution. Further, as a housing 206 and a housing 244 which make electrical connection of the positive electrode 204 and the negative electrode 232 to the outside, commercially available objects were used. Specifically, the housing 206 and the housing 244 were formed using stainless steel (SUS). Further, a washer 242 and a spacer 240 formed using stainless steel (SUS) were prepared; commercially available objects were used as the spacer 240 and the washer 242.

As illustrated in FIG. 10, as for the positive electrode 204, the negative electrode 232, and the separator 210 which were soaked in the electrolyte solution, the washer 242, the spacer 240, the negative electrode 232, the ring-shaped insulator 220, the separator 210, the positive electrode 204, and the housing 244 were stacked in the order presented with the housing 206 provided below; the housing 206 and the housing 244 were pressed and bonded together with a "coin-cell crimping machine". Thus, a coin-type lithium ion secondary battery cell was manufactured.

As the electrolyte solution, a solution in which $LiPF_6$ was dissolved in a mixed solvent of EC and DEC was used.

Figure 4:
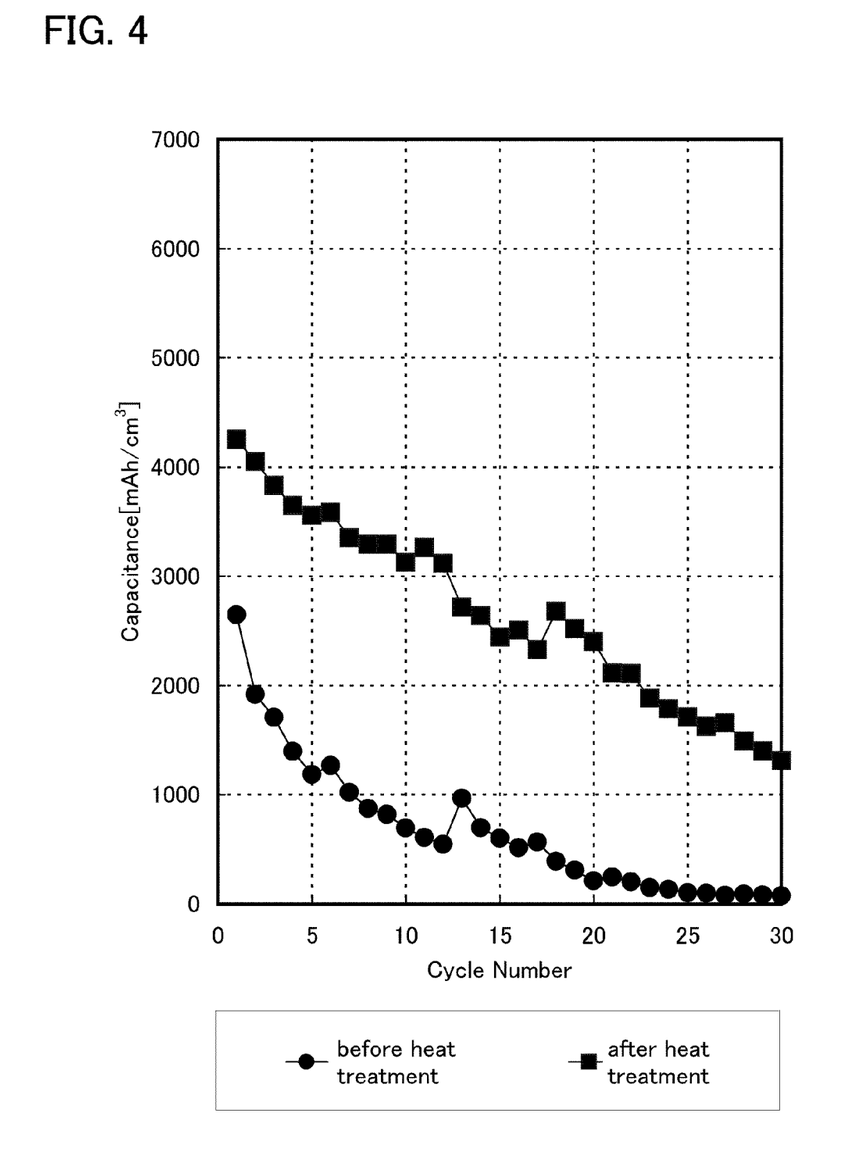
FIG. 4 is a first graph in which charge-discharge cycle characteristics are compared.

Here, the sample 1 and the sample 2 were charged and discharged repeatedly, and the result is shown in FIG. 4. The charge-discharge characteristics were measured with a charge-discharge measuring instrument. For the measurements of charge and discharge, a constant current mode is used, and the sample 1 and the sample 2 were each charged and discharged with a current of 2.0 mA at the rate of approximately 0.2 C. The upper limit voltage was 1.0 V, and the lower limit voltage was 0.03 V. Note that all of the measurements were performed at room temperature.

When the sample 1 and the sample 2 in FIG. 4 are compared to each other, the charge-discharge cycle characteristics of the sample 1 are less degraded than the charge-discharge cycle characteristics of the sample 2. Thus, in one embodiment of the present invention, degradation becomes less by heat treatment performed after the formation of the silicon film to be the positive electrode active material.

Next, the sample 1 and the sample 2 was measured by SIMS, thereby, the concentrations of titanium, silicon, oxygen, hydrogen, carbon, nitrogen, and fluorine were obtained as shown in FIG. 5, FIG. 6, FIG. 7, and FIG. 8.

Figure 5:
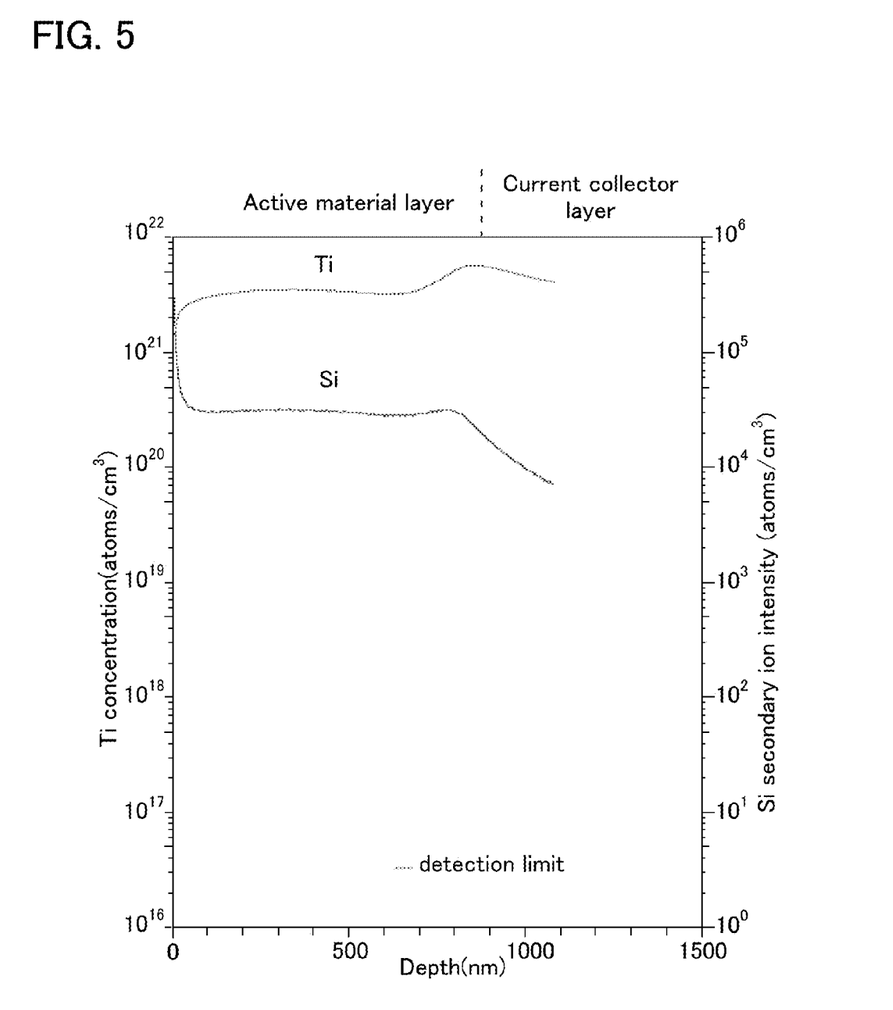
FIG. 5 is a first graph showing SIMS data.
Figure 6:
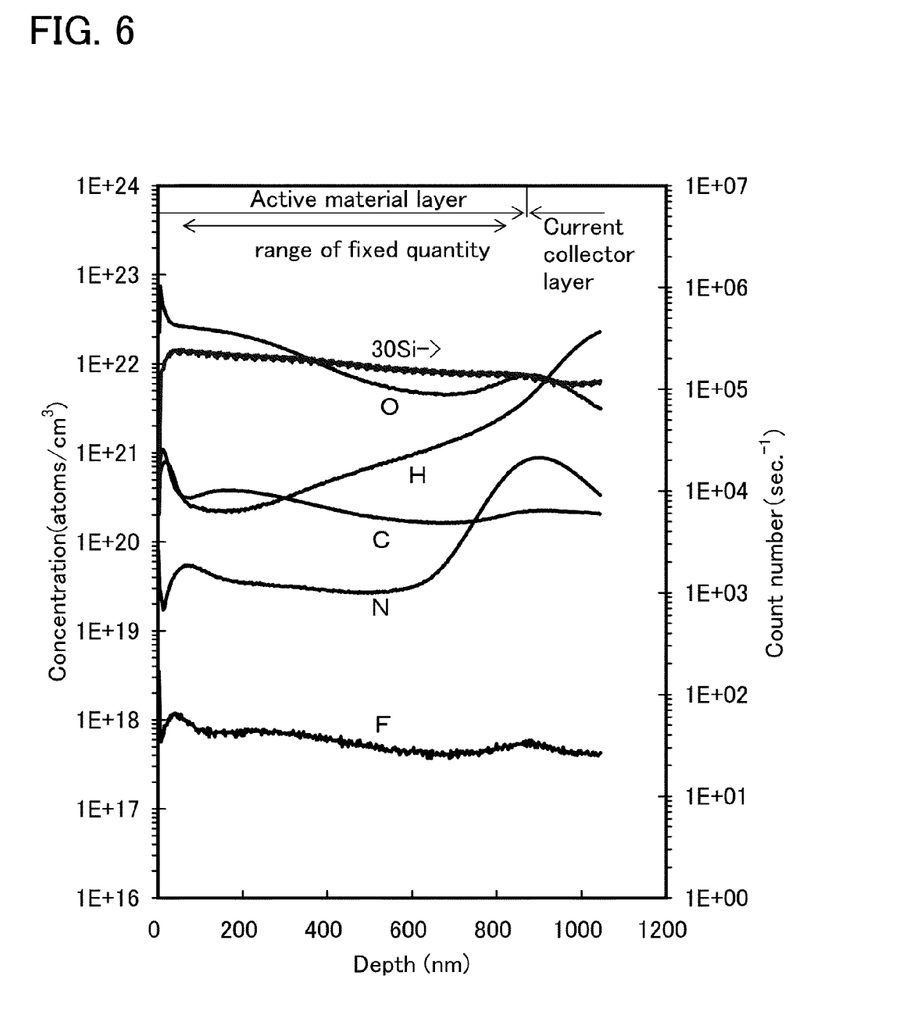
FIG. 6 is a second graph showing SIMS data.
Figure 9A:
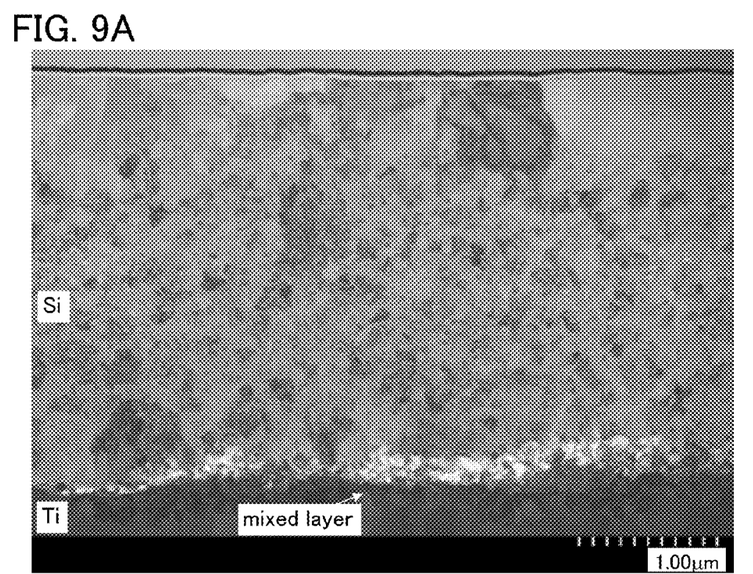
FIGS. 9A and 9B are each a STEM image of a layer containing titanium as its main component and a layer containing silicon as its main component.

FIG. 5 shows SIMS data of titanium and silicon in the sample 1. FIG. 6 shows SIMS data of oxygen, hydrogen, carbon, nitrogen, and fluorine in the sample 1. According to FIG. 5, a mixed layer of titanium and silicon is included between a layer containing titanium as its main component and a layer containing silicon as its main component; the layers are formed with the use of a method for forming an electrode which is one embodiment of the present invention. In addition, the concentration of titanium in the mixed layer is higher than or equal to $3.0 \times 10^{21}$ cm$^{-3}$ and less than or equal to $6.0 \times 10^{21}$ cm$^{-3}$. FIG. 9A is a STEM image of the sample 1. According to FIG. 9A, most part of a silicon layer (Si layer) is crystallized. It is confirmed from a result of analysis with EDX and a result of analysis of FIG. 9A that silicon is included in the layer containing titanium as its main component in FIG. 9A. Note that according to FIG. 5, titanium is dispersed in the layer containing silicon as its main component. Note that a white region in FIG. 9A shows a cavity.

Figure 7:
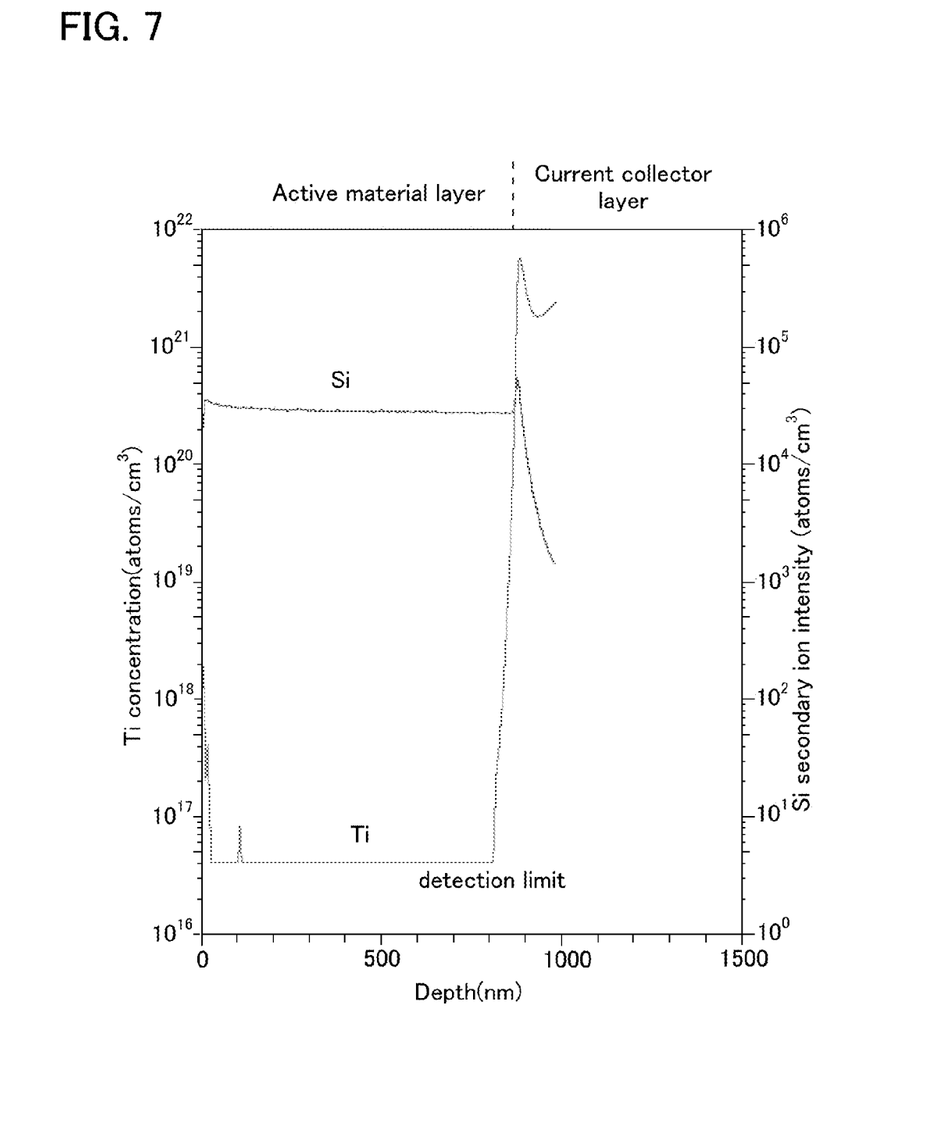
FIG. 7 is a third graph showing SIMS data.
Figure 8:
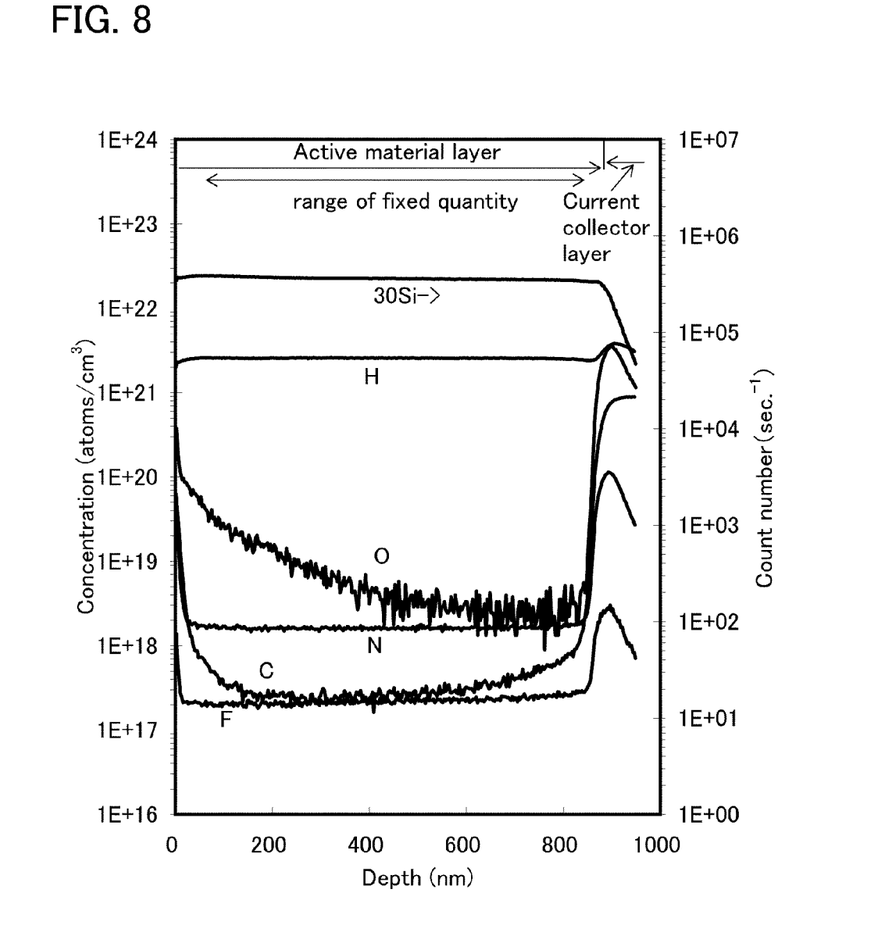
FIG. 8 is a fourth graph showing SIMS data.
Figure 9B:
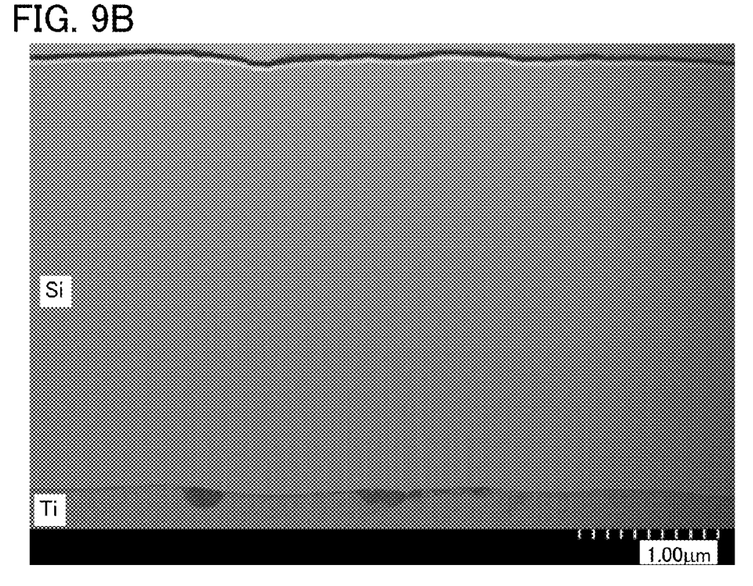

FIG. 7 shows SIMS data of titanium and silicon in the sample 2. FIG. 8 shows SIMS data of oxygen, hydrogen, carbon, nitrogen, and fluorine in the sample 2. According to FIG. 7, a mixed layer of titanium and silicon is not included, and titanium is not dispersed in the layer containing silicon as its main component. FIG. 9B is a STEM image of the sample 2. In FIG. 9B, a silicon layer is not crystallized and a mixed layer of titanium and silicon is not observed between a titanium layer and the silicon layer.

Further, in FIG. 8 (sample 2), the concentration of oxygen in the layer containing silicon as its main component is higher than or equal to $1.3 \times 10^{18}$ cm$^{-3}$ and lower than or equal to $1.0 \times 10^{20}$ cm$^{-3}$. On the other hand, in FIG. 6 (sample 1), the concentration of oxygen in the silicon layer is higher than or equal to $4.5 \times 10^{21}$ cm$^{-3}$ and lower than or equal to $2.7 \times 10^{22}$ cm$^{-3}$; thus, it is shown that the amount of oxygen in the layer containing silicon as its main component in the sample 2 is low. The reason of this is described as follows. The sample 1 was subjected to heat treatment in a state where the layer containing silicon as its main component is in contact with the layer containing titanium as its main component, whereby titanium is dispersed in the layer containing silicon as its main component, and a surface of silicon of the sample 1 is oxidized and silicon oxide is formed in part thereof. Titanium reduces the silicon oxide, and oxygen is captured by titanium in the layer containing silicon as its main component. When silicon oxide is included, lithium is oxidized, and lithium oxide is generated. Such a reaction in which lithium is oxidized and thus lithium oxide is generated is irreversible. Therefore, the charge-discharge cycle characteristics are degraded. In the sample 1, titanium is dispersed in the layer containing silicon as its main component; thus, the degradation of the charge-discharge cycle characteristics is suppressed. On the other hand, in the sample 2, it is considered that the charge-discharge cycle characteristics are degraded because lithium oxide is generated by bonding doped lithium to oxygen at the time of charging and discharging, whereby the number of ions which transmit electric charges is reduced.

This application is based on Japanese Patent Application serial no. 2010-073768 filed with Japan Patent Office on Mar. 26, 2010, the entire contents of which are hereby incorporated by reference.

The invention claimed is:

1. A secondary battery comprising:
    an electrode comprising:
        a first layer including titanium as a main component;
        a second layer including silicon or a silicon compound over the first layer; and
        a mixed layer including titanium and silicon between the first layer and the second layer,
    wherein the second layer comprises polycrystalline silicon,
    wherein the mixed layer comprises a cavity,
    wherein a concentration of oxygen in the second layer is higher than or equal to $4.5 \times 10^{21}$ cm$^{-3}$, and lower than or equal to $2.7 \times 10^{22}$ cm$^{-3}$, and
    wherein a concentration of hydrogen in the second layer is lower than or equal to $1.0 \times 10^{21}$ cm$^{-3}$.

2. The secondary battery according to claim 1, wherein an oxide of titanium has conductivity.

3. The secondary battery according to claim 1, wherein the mixed layer is a layer of titanium silicide.

4. The secondary battery according to claim 1, wherein the first layer is provided over a substrate.

5. The secondary battery according to claim 4, wherein a conductivity of the substrate is higher than a conductivity of titanium.

6. The secondary battery according to claim 4, wherein a material of the substrate is selected from copper, iron, nickel, and stainless steel.

7. The secondary battery according to claim 1, wherein most part of the second layer is the crystal region.

8. A secondary battery comprising:
    an electrode comprising:
        a first layer including titanium as a main component;
        a second layer including silicon or a silicon compound over the first layer; and
        a mixed layer including titanium and silicon between the first layer and the second layer,
    wherein the second layer comprises polycrystalline silicon,
    wherein the mixed layer comprises a cavity,
    wherein a concentration of hydrogen in the second layer is lower than or equal to $1.0 \times 10^{21}$ cm$^{-3}$,
    wherein a concentration of oxygen in the second layer is higher than or equal to $4.5 \times 10^{21}$ cm$^{-3}$, and lower than or equal to $2.7 \times 10^{22}$ cm$^{-3}$, and
    wherein oxygen affinity of titanium is higher than oxygen affinity of an ion which gives and receives electric charge in the secondary battery.

9. The secondary battery according to claim 8, wherein an oxide of titanium has conductivity.

10. The secondary battery according to claim 8, wherein the mixed layer is a layer of titanium silicide.

11. The secondary battery according to claim 8, wherein the ion is alkali metal ion or alkaline earth metal ion.

12. The secondary battery according to claim 8, wherein the ion is lithium ion.

13. The secondary battery according to claim 8, wherein the first layer is provided over a substrate.

14. The secondary battery according to claim 13, wherein a conductivity of the substrate is higher than a conductivity of titanium.

15. The secondary battery according to claim 13, wherein a material of the substrate is selected from copper, iron, nickel, and stainless steel.

16. The secondary battery according to claim 8, wherein most part of the second layer is the crystal region.

17. A method for forming an electrode of a secondary battery, comprising the steps of:
    forming a first layer including titanium as a main component;
    forming a second layer including silicon or a silicon compound over the first layer by a plasma CVD method, wherein a concentration of hydrogen in the second layer is higher than $1.0 \times 10^{21}$ cm$^{-3}$; and
    forming a mixed layer including titanium and silicon between the first layer and the second layer by a heat treatment at 500° C. or higher,
    wherein the second layer comprises polycrystalline silicon,
    wherein the mixed layer comprises a cavity,
    wherein a concentration of oxygen in the second layer after the heat treatment is higher than or equal to $4.5 \times 10^{21}$ cm$^{-3}$, and lower than or equal to $2.7 \times 10^{22}$ cm$^{-3}$, and
    wherein a concentration of hydrogen in the second layer after the heat treatment is lower than or equal to $1.0 \times 10^{21}$ cm$^{-3}$.

18. The method for forming the electrode of the secondary battery according to claim 17, wherein the mixed layer is a layer of titanium silicide.

19. The method for forming the electrode of the secondary battery according to claim 17, wherein oxygen affinity of titanium is higher than oxygen affinity of an ion which gives and receives electric charge in the secondary battery.

20. The method for forming the electrode of the secondary battery according to claim 19, wherein the ion is alkali metal ion or alkaline earth metal ion.

21. The method for forming the electrode of the secondary battery according to claim 19, wherein the ion is lithium ion.

22. The method for forming the electrode of the secondary battery according to claim 17, wherein the first layer is provided over a substrate.

23. The method for forming the electrode of the secondary battery according to claim 22, wherein a conductivity of the substrate is higher than a conductivity of titanium.

24. The method for forming the electrode of the secondary battery according to claim 22, wherein a material of the substrate is selected from copper, iron, nickel, and stainless steel.

25. The method for forming the electrode of the secondary battery according to claim 17, wherein a concentration of oxygen in the second layer is reduced by the heat treatment.

26. The method for forming the electrode of the secondary battery according to claim 17, wherein the heat treatment is performed at 700° C.

27. The method for forming the electrode of the secondary battery according to claim 17, wherein forming the second layer by a plasma CVD method is performed under an atmosphere comprising phosphine.

28. A method for forming an electrode of a secondary battery, comprising the steps of:
   forming a first layer including titanium as a main component;
   forming a second layer including silicon or a silicon compound over the first layer by a plasma CVD method, wherein a concentration of hydrogen in the second layer is higher than $1.0 \times 10^{21}$ cm$^{-3}$; and
   performing a heat treatment at 500° C. or higher so that a part of the first layer reacts with a part of the second layer to form a layer of titanium silicide between the first layer and the second layer,
   wherein the second layer comprises polycrystalline silicon,
   wherein the layer of titanium silicide comprises a cavity,
   wherein a concentration of oxygen in the second layer after the heat treatment is higher than or equal to $4.5 \times 10^{21}$ cm$^{-3}$, and lower than or equal to $2.7 \times 10^{22}$ cm$^{-3}$, and
   wherein a concentration of hydrogen in the second layer is lower than or equal to $1.0 \times 10^{21}$ cm$^{-3}$ after the heat treatment.

29. The method for forming the electrode of the secondary battery according to claim 28, wherein oxygen affinity of titanium is higher than oxygen affinity of an ion which gives and receives electric charge in the secondary battery.

30. The method for forming the electrode of the secondary battery according to claim 29, wherein the ion is alkali metal ion or alkaline earth metal ion.

31. The method for forming the electrode of the secondary battery according to claim 29, wherein the ion is lithium ion.

32. The method for forming the electrode of the secondary battery according to claim 28, wherein the first layer is provided over a substrate.

33. The method for forming the electrode of the secondary battery according to claim 32, wherein a conductivity of the substrate is higher than a conductivity of titanium.

34. The method for forming the electrode of the secondary battery according to claim 32, wherein a material of the substrate is selected from copper, iron, nickel, and stainless steel.

35. The method for forming the electrode of the secondary battery according to claim 28, wherein a concentration of oxygen in the second layer is reduced by the heat treatment.

36. The method for forming the electrode of the secondary battery according to claim 28, wherein the heat treatment is performed at 700° C.

37. The method for forming the electrode of the secondary battery according to claim 28, wherein forming the second layer by a plasma CVD method is performed under an atmosphere comprising phosphine.

* * * * *